United States Patent
Blurfrushan et al.

(10) Patent No.: US 9,058,638 B2
(45) Date of Patent: Jun. 16, 2015

(54) SUPER RESOLUTION ENCODING SCREENS THAT MINIMIZE AFFECTS OF LOSSY COMPRESSION AND DATA VARIATIONS

(71) Applicant: Xerox Corporation, Norwalk, CT (US)

(72) Inventors: Farzin Blurfrushan, Torrance, CA (US); Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 311 days.

(21) Appl. No.: 13/790,424

(22) Filed: Mar. 8, 2013

(65) Prior Publication Data

US 2014/0254950 A1    Sep. 11, 2014

(51) Int. Cl.
| | |
|---|---|
| G06K 9/00 | (2006.01) |
| G06T 9/00 | (2006.01) |
| G09G 5/00 | (2006.01) |
| G09G 3/20 | (2006.01) |

(52) U.S. Cl.
CPC .. *G06T 9/00* (2013.01); *G09G 5/00* (2013.01); *G09G 3/2003* (2013.01); *G09G 3/2059* (2013.01); *G09G 2340/0457* (2013.01)

(58) Field of Classification Search
None
See application file for complete search history.

(56) References Cited

U.S. PATENT DOCUMENTS

| | | | |
|---|---|---|---|
| 6,020,979 A | 2/2000 | Zeck et al. | |
| 7,636,480 B2 | 12/2009 | Zhang et al. | |
| 8,189,237 B2 | 5/2012 | McElvain | |
| 2006/0126952 A1 | 6/2006 | Suzuki et al. | |
| 2006/0279749 A1* | 12/2006 | Zhang et al. | 358/1.2 |
| 2007/0252838 A1 | 11/2007 | Hains et al. | |
| 2007/0279652 A1* | 12/2007 | McElvain et al. | 358/1.9 |
| 2007/0279693 A1* | 12/2007 | McElvain et al. | 358/3.06 |
| 2008/0144057 A1* | 6/2008 | McElvain | 358/1.9 |
| 2010/0054338 A1 | 3/2010 | Suzuki et al. | |
| 2010/0103435 A1* | 4/2010 | Namikata | 358/1.2 |
| 2010/0103468 A1* | 4/2010 | Namikata | 358/3.23 |
| 2012/0249618 A1* | 10/2012 | Sugiyama et al. | 345/691 |
| 2012/0314261 A1* | 12/2012 | Williams | 358/3.06 |
| 2014/0036316 A1* | 2/2014 | Lin et al. | 358/3.23 |
| 2014/0254950 A1* | 9/2014 | Blurfrushan et al. | 382/244 |

* cited by examiner

*Primary Examiner* — Sean Motsinger
(74) *Attorney, Agent, or Firm* — Kermit D. Lopez; Luis M. Ortiz; Ortiz & Lopez, PLLC

(57) ABSTRACT

Methods and systems for super resolution encoding. A matching pattern can be encoded with respect to an original pattern to generate a matching function for converting a screen into an IOT screen. Then, an operation can be implemented for accounting for a disturbance that causes a change in gray value that includes a minimal error while remaining close to the original pattern. The gray value is then mapped to the matching pattern via the matching function to convert the screen into the IOT screen and thereby minimize the effects of lossy compression and data variations caused by the disturbance.

20 Claims, 5 Drawing Sheets

SUPER RESOLUTION ENCODING SCREENS THAT MINIMIZE AFFECTS OF LOSSY COMPRESSION AND DATA VARIATIONS

FIELD OF THE INVENTION

Embodiments are generally related to image-processing devices and methods. Embodiments are also related to SRE (Super Resolution Encoding) screens and applications thereof.

BACKGROUND

SRE is a technique for achieving high resolution quality text and graphics. High resolution patterns are encoded as gray pixel values at lower resolution and then decoded on the IOT (Input Output Terminal) sometimes also referred to as a print engine module. In order to recover the original high resolution patterns, the gray values need to be preserved. Unfortunately, very complex pages can require lossy compression, including lossy compression of the gray values, resulting in completely different gray values delivered to and rendered by the IOT.

Some SRE screens are designed assuming lossless compression. Such screens may be arranged in terms of increasing gray value but in no particular order. In some cases complimentary screens may be placed next to each other. This arrangement can result in completely different patterns if compression or other alterations in the data path change the gray values.

In some image-processing applications, there can be lossy compression. Less complex pages avoid doing lossy compression on SRE objects, but in very complex pages the problem cannot be avoided which can result in alteration of the SRE values. Other modules in image path may also cause the value to be changed. This invention provides a solution that employs SRE by optimizing SRE code assignment and/or reassignment through a remapping mechanism.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image-processing methods and systems.

It is another aspect of the disclosed embodiments to provide for improved methods and systems for minimizing the affects of lossy compression and data variations in image-processing applications.

It is yet another aspect of the present invention to provide for an improved SRE (Super Resolution Encoding) method and system.

The aforementioned aspects and other objectives and advantages can now be achieved as described herein. Methods and systems for super resolution encoding are disclosed. A matching pattern can be encoded with respect to an original pattern to generate a matching function for converting a screen into an IOT screen. Then, an operation can be implemented for accounting for a disturbance that causes a change in gray value that includes a minimal error while remaining close to the original pattern. The gray value is then mapped to the matching pattern via the matching function to convert the screen into the IOT screen and thereby minimize the effects of lossy compression and data variations caused by the disturbance.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As indicated previously, SRE is a way of encoding a bit pattern in higher resolution into a gray value (also referred to as a "Gray Font"). Similar to Anti-Aliasing, objects are rendered at a higher resolution. The main difference is that for Anti-Aliasing we are averaging the pixel values at the higher resolution to create new gray values. These values will be halftoned at the IOT when printing. For SRE, we are "encoding" high resolution pixel patterns into gray values instead of averaging. A special tag is added to tell the IOT that the pixel is an encoded gray value. The IOT will detect the tag and then decode the gray value to recreate the original pattern in high resolution.

Figure 1:
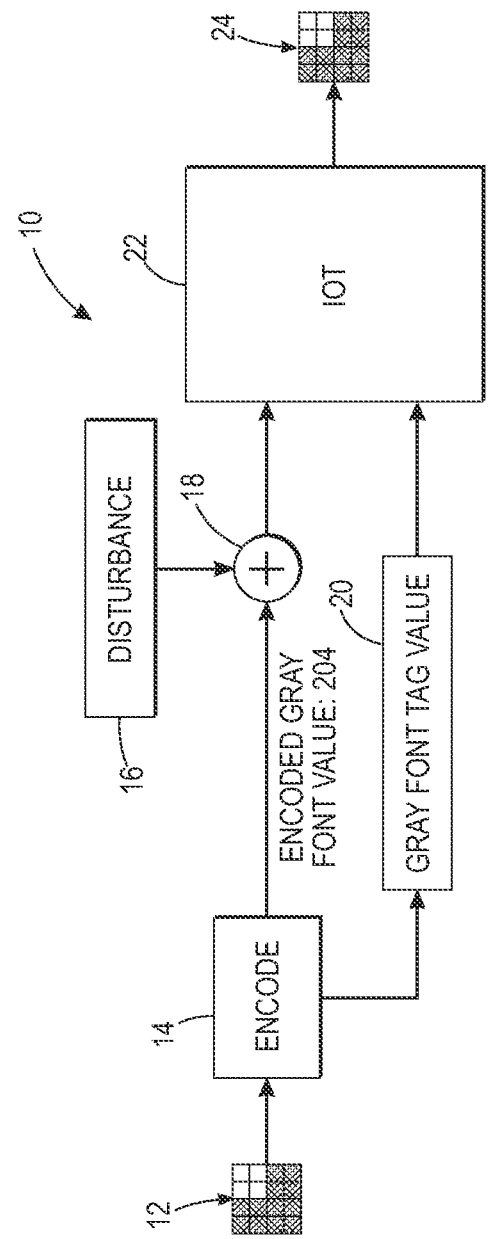
FIG. 1 illustrates a flow chart of logical operations depicting a super resolution encoding/decoding method, in which disturbance can be caused by compression.

FIG. 1 illustrates a flow chart of logical operations depicting a super resolution encoding/decoding method 10, in which disturbance can be caused by compression. As shown in FIG. 1, an encoding operation 14 can be performed with respect to a pattern 12. Output from the encoding operation 14 can be input to gray font tag value 20 and also to an adder 18 which combines a disturbance value 16 or disturbance factors with an encoded gray font value of 204. Output from the adder 18 and the gray font tag value 20 is fed to the IOT 22, which in turn generates an output pattern 24.

FIG. 1 depicts the basic concept behind SRE. That is, Gray Font/SRE patterns can be defined at a resolution, e.g. 1200 DPI or 2400 DPI, higher than the imaging resolution, i.e. 600 DPI. For 2400 DPI SRE, we have 16 high resolution pixels for each gray pixel in 600 DPI. There are $2^{16}$ possible patterns but we can only encode 256 patterns in an 8 bit gray value. Some image processing systems select the 256 most common and xerographically stable patterns. These are the patterns that can be used to define, or approximate, the edges of text and graphics with the observation that patterns containing scattered dots are not found often in common text and graphics. For 2400 SRE, some pattern matching needs to be done to choose the closest possible Gray Font pattern if the desired pattern is not part of 256 patterns. The IOT specs would show the complete screen set.

Thus, a Super Resolution Encoding/Decoding path is shown in FIG. 1, wherein the disturbance 16 can be caused by compression. If the disturbance is 0, the IOT 22 will receive the encoded Gray Font precisely and will correctly decode the desired output pattern. If the disturbance 16 is non-zero, a completely different pattern may be produced. Thus, it can be appreciated that even a slight change due to lossy compression in the encoded Gray Font value (e.g., video data) can result in a completely different pattern.

With certain image-processing systems, it is possible to program the 256 screen patterns as we choose. This provides a way to produce a reasonably close pattern in case some variation of gray value happens due to lossy compression. In other words, if the gray value changes by some margin, it will not cause a drastic change in the output data. The new screens will be arranged in a progressive fashion producing only minor diffs/error when compared to the neighboring screen. On older "legacy" image processing products, this can be achieved by employing a TRC/Mapping function based on the Gray Font tag that will map the values to the printer's SRE screen values at the final stage.

Figure 2:
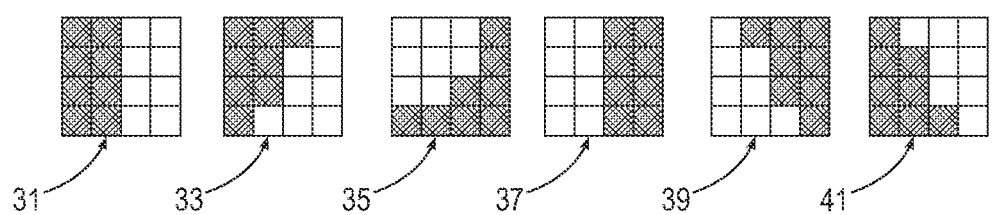
FIG. 2 illustrates a graphical view of sample screens for gray font values of 132 to 137, with no correlation between neighboring screens exist and in some cases neighboring screens are complimentary.

FIG. 2 illustrates a pictorial diagram of a snapshot of certain screens 31, 33, 35, 37, 39, and 41 for respective gray font values of 132, 133, 134, 135, 136, and 137. As can be seen in FIG. 2, normally no correlation between neighboring screens exist and in some cases neighboring screens are complimentary (e.g, screen gray vont values of 136 and 137 with respect to screens 39 and 41).

Figure 3:
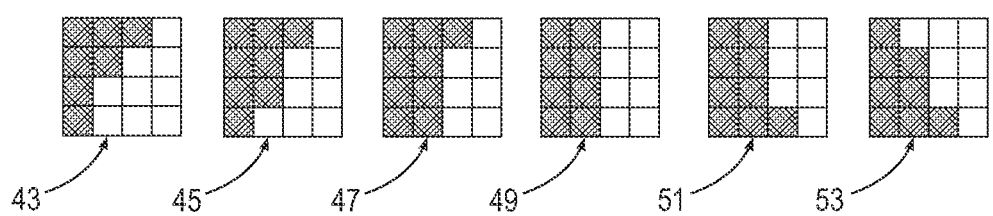
FIG. 3 illustrates a graphical view of patterns arranged based on an algorithm to reduce errors between neighboring screens.

The patterns can be arranged based on an algorithm to reduce errors between neighboring screens. FIG. 3, for example, illustrates a graphical view of patterns (screens) 43, 45, 47, 49, 51, and 53 arranged based on an algorithm to reduce errors between neighboring screens. Such new screens can be used directly on IOTs with programmable SRE features, or as mentioned can be mapped to the printer's SRE using a mapping function, which commonly exists as the TRC mechanism for digital printing systems.

Figure 4:
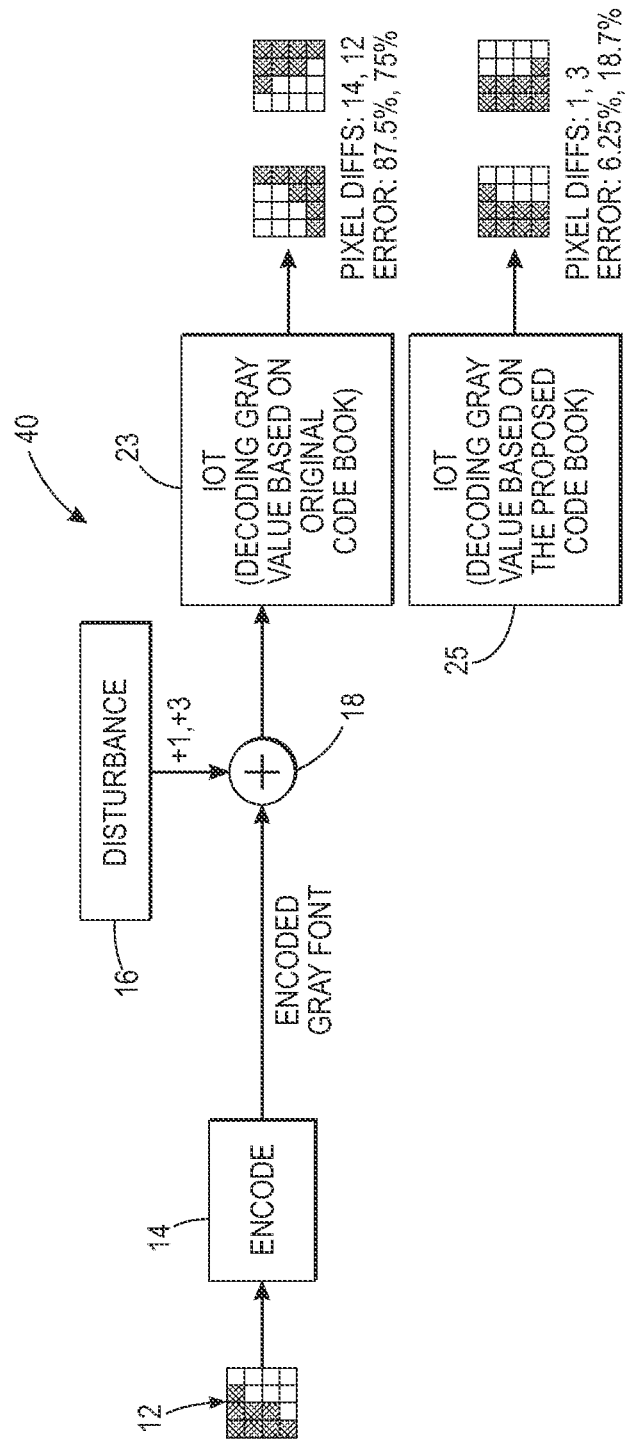
FIG. 4 illustrates a block diagram depicting a 2400 DPI code pattern employed in a programmable SRE model, in accordance with a preferred embodiment.

FIG. 4 illustrates a block diagram depicting a method 40 including a 2400 DPI code pattern employed in a programmable SRE model, in accordance with a preferred embodiment. Note that in FIGS. 1 and 4, similar parts or elements are generally indicated by identical reference numerals. In method 40, the IOT is shown as two IOT's 23 and 25.

Figure 5:
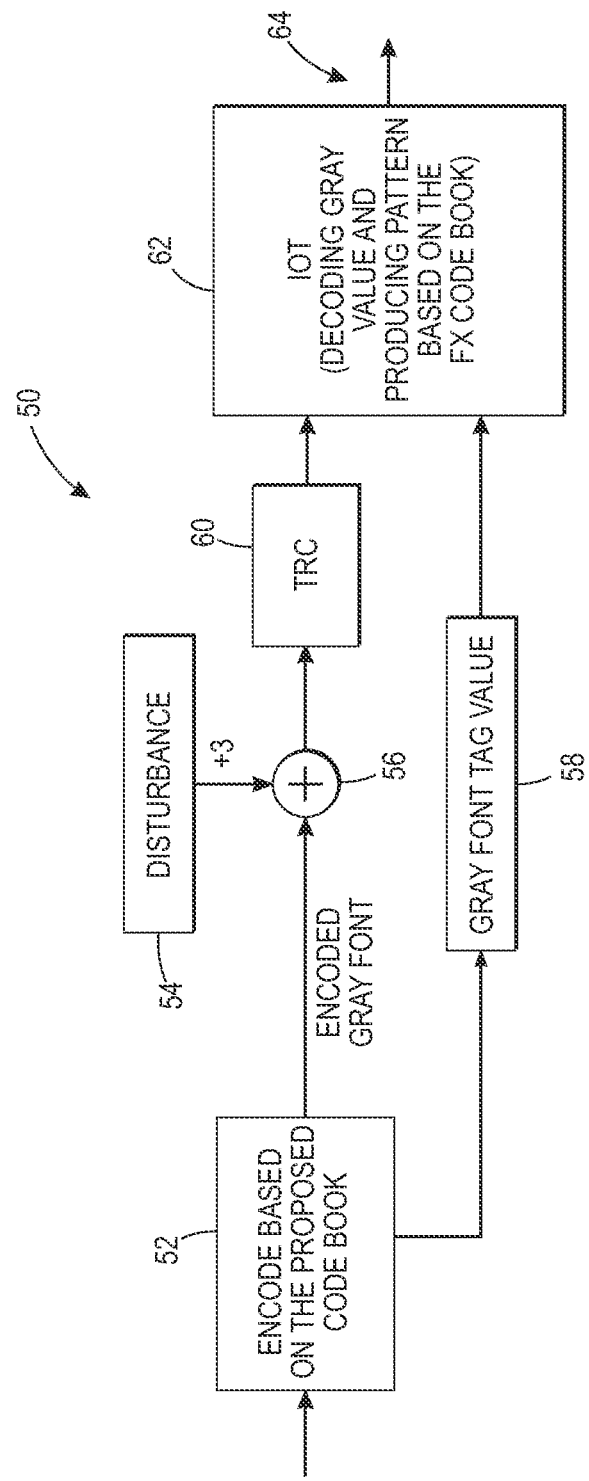
FIG. 5 illustrates a block diagram of a TRC (Tone-Reproduction Curve) implementation in which a RIP (Raster Image Processor) encodes a matching pattern via a code book, in accordance with an alternative embodiment.

The proposed code book can be implemented on the systems with immutable SRE screens by implementing a mapping function (for example, using the TRC) that would convert from the proposed SRE screen to the IOT screens. FIG. 5 depicts the basic diagram.

FIG. 5 illustrates a block diagram of a method 50 for an EPC TRC implementation in which a RIP encodes a matching pattern via a code book, in accordance with an alternative embodiment. In the method 50 shown in FIG. 5, encoding 52 is based on a proposed code book and output thereof (encoded Gray Font) is provided to the adder 56 along with disturbance 54. The Gray Font tag value 58 is provided as input to IOT 62. Output from the adder 56 is fed to the TRC 60 which in turn provides an output that is fed as input to the IOT 62, which generates an output 64. In this example shown in FIG. 5, the RIP (e.g., block 52) encodes the matching pattern using a proposed code book. The disturbance 54 will cause the change in gray value that will have some error but still close to original pattern. The TRC 60 maps the value to the matching pattern in the immutable code book that is defined for the IOT 62.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module." Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an Internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein, such as, for example, the various instructions shown with respect to particular blocks in FIGS. 4-5.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
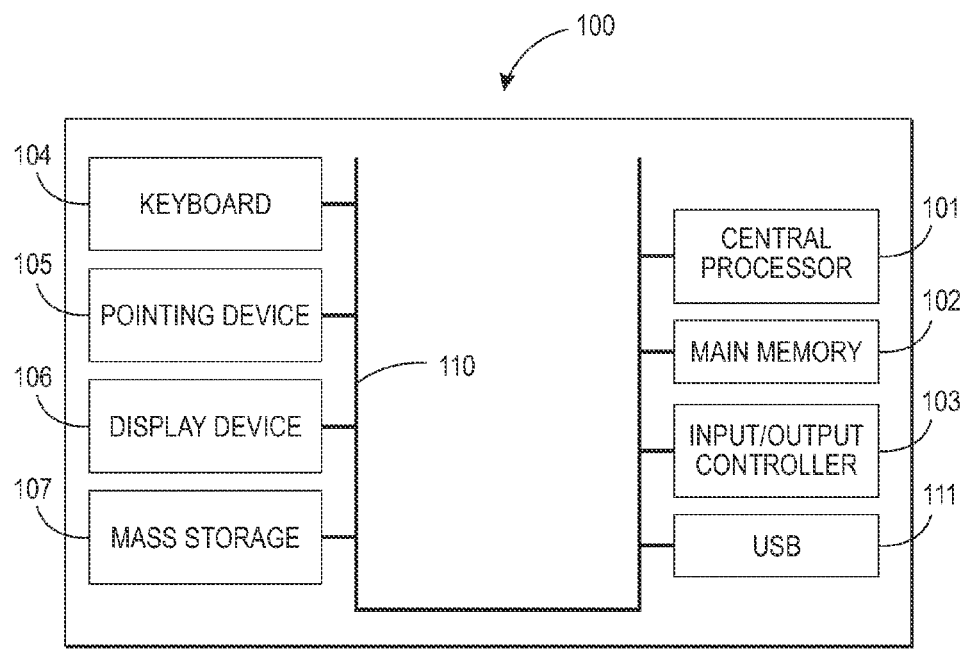
FIG. 6 illustrates a schematic view of a computer system, which can be implemented in accordance with the disclosed embodiments.
Figure 7:
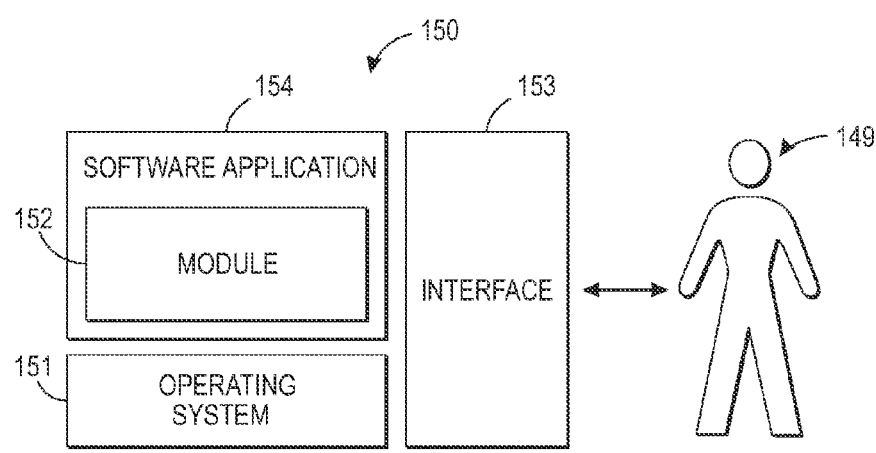
FIG. 7 illustrates a schematic view of a system including at least one module, an operating system, and a user interface, in accordance with the disclosed embodiments.

FIGS. 6-7 are provided as exemplary diagrams of data-processing environments in which embodiments of the present invention may be implemented. It should be appreciated that FIG. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, the disclosed embodiments may be implemented in the context of a data-processing system 100 that includes, for example, a central processor 101 (or other processors), a main memory 102, an input/output controller 103, and in some embodiments, a USB (Universal Serial Bus) 111 or other appropriate peripheral connection. System 100 can also include a keyboard 104, an input device 105 (e.g., a pointing device such as a mouse, track ball, pen device, etc.), a display device 106, and a mass storage 107 (e.g., a hard disk). As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 7 illustrates a computer software system 150, which may be employed for directing the operation of the data-processing system 100 depicted in FIG. 6. Software application 154, stored in main memory 102 and on mass storage 107 shown in FIG. 6, generally includes and/or is associated with a kernel or operating system 151 and a shell or interface 153. One or more application programs, such as module(s) 152, may be "loaded" (i.e., transferred from mass storage 107 into the main memory 102) for execution by the data-processing system 100. The data-processing system 100 can receive user commands and data through user interface 153 accessible by a user 149. These inputs may then be acted upon by the data-processing system 100 in accordance with instructions from operating system 151 and/or software application 154 and any software module(s) 152 thereof.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 152) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153 (e.g., a graphical user interface) can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, user proximity detection module 152, which can include instructions for carrying out steps or logical operations such as those shown in FIGS. 4-5 herein.

FIGS. 6-7 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

Embodiments are disclosed herein describing a SRE scheme in which binary patterns are structurally similar map to similar gray values. Techniques in halftone dot design can be leveraged to achieve this property. Benefits of the disclosed embodiments include robustness with respect to lossy compression and other sources of noise.

Based on the foregoing, it can be appreciated that a number of embodiments, preferred and alternative, are disclosed herein. For example, in one embodiment, a method is disclosed for super resolution encoding. Such a method can include, for example, the steps or logical operations of encoding a matching pattern with respect to an original pattern to generate a matching function for converting a screen into an IOT screen, accounting for a disturbance that causes a change in gray value that includes a minimal error while remaining close to the original pattern, and mapping the gray value to the matching pattern via the matching function to convert the screen into the IOT screen and thereby minimize the effects of lossy compression and data variations caused by the disturbance.

In another embodiment, step or logical operation can be implemented for configuring the matching pattern to reduce errors between neighboring screens including IOT screen. In still another embodiment, the step or logical operation of encoding a matching pattern with respect to an original pattern to generate a matching function for converting a screen into an IOT screen can further include a step or logical operation for encoding the matching pattern via a raster image processor via a particular code book.

In another another embodiment the step or logical operation of mapping the gray value to the matching pattern can further include a step or logical operation of mapping the gray value to the matching pattern via a tone-reproduction curve. In yet another embodiment, the matching pattern can be contained in a particular code book defined for IOT.

In another embodiment, steps or logical operations can be provided for encoding a matching pattern with respect to an original pattern to generate a matching function for converting a screen into an IOT screen, further comprises encoding the matching pattern via a raster image processor via a particular code book, and mapping the gray value to the matching pattern, further comprises mapping the gray value to the matching pattern via a tone-reproduction curve. In still another embodiment, a step or logical operation can be provided for configuring the matching pattern to reduce errors between neighboring screens including IOT screen. Additionally, as indicated previously the matching pattern can be contained in a particular code book defined for IOT.

In another embodiment, a system for super resolution encoding can be implemented. Such a system can include, for example, a processor and a computer-usable medium embodying computer program code, wherein the computer-usable medium is capable of communicating with the processor. Such computer program code can include instructions, which are executable by the processor and configured, for example, for encoding a matching pattern with respect to an original pattern to generate a matching function for converting a screen into an IOT screen, accounting for a disturbance that causes a change in gray value that includes a minimal error while remaining close to the original pattern, and mapping the gray value to the matching pattern via the matching function to convert the screen into the IOT screen and thereby minimize the effects of lossy compression and data variations caused by the disturbance.

In another embodiment, such instructions can be further modified for configuring the matching pattern to reduce errors between neighboring screens including IOT screen. In yet another embodiment, the instructions for encoding a matching pattern with respect to an original pattern to generate a matching function for converting a screen into an IOT screen can further include instructions configured for encoding the matching pattern via a raster image processor via a particular code book. In another embodiment, the instructions for mapping the gray value to the matching pattern can further include instructions configured for mapping the gray value to the matching pattern via a tone-reproduction curve. In some embodiments, the matching pattern can be contained in a particular code book defined for IOT.

In another embodiment, a processor-readable medium storing code representing instructions to cause a process for super resolution encoding can be provided. Such code can include code to, for example, encode a matching pattern with respect to an original pattern to generate a matching function for converting a screen into an IOT screen, account for a disturbance that causes a change in gray value that includes a minimal error while remaining close to the original pattern, and map the gray value to the matching pattern via the matching function to convert the screen into the IOT screen and thereby minimize the effects of lossy compression and data variations caused by the disturbance.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for super resolution encoding, said method comprising:
   encoding a matching pattern with respect to an original pattern to generate a matching function for converting a screen into an IOT screen;
   accounting for a disturbance that causes a change in gray value that includes a minimal error while remaining close to said original pattern; and
   mapping said gray value to said matching pattern via said matching function to convert said screen into said IOT screen and thereby minimize the effects of lossy compression and data variations caused by said disturbance.

2. The method of claim 1 further comprising configuring said matching pattern to reduce errors between neighboring screens including IOT screen.

3. The method of claim 1 wherein encoding a matching pattern with respect to an original pattern to generate a matching function for converting a screen into an IOT screen, further comprises:
   encoding said matching pattern via a raster image processor via a particular code book.

4. The method of claim 1 wherein mapping said gray value to said matching pattern further comprises mapping said gray value to said matching pattern via a tone-reproduction curve.

5. The method of claim 4 wherein said matching pattern is contained in a particular code book defined for IOT.

6. The method of claim 1 wherein:
   encoding a matching pattern with respect to an original pattern to generate a matching function for converting a screen into an IOT screen further comprises encoding said matching pattern via a raster image processor via a particular code book; and
   mapping said gray value to said matching pattern further comprises mapping said gray value to said matching pattern via a tone-reproduction curve.

7. The method of claim 6 further comprising configuring said matching pattern to reduce errors between neighboring screens including IOT screen.

8. The method of claim 6 wherein said matching pattern is contained in a particular code book defined for IOT.

9. A system for super resolution encoding, said system comprising:
   a processor; and a computer-usable medium embodying computer program code, said computer-usable medium capable of communicating with the processor, said computer program code comprising instructions executable by said processor and configured for:

encoding a matching pattern with respect to an original pattern to generate a matching function for converting a screen into an IOT screen;

accounting for a disturbance that causes a change in gray value that includes a minimal error while remaining close to said original pattern; and mapping said gray value to said matching pattern via said matching function to convert said screen into said IOT screen and thereby minimize the effects of lossy compression and data variations caused by said disturbance.

10. The system of claim 9 wherein said instructions are further modified for configuring said matching pattern to reduce errors between neighboring screens including IOT screen.

11. The system of claim 9 wherein said instructions for encoding a matching pattern with respect to an original pattern to generate a matching function for converting a screen into an IOT screen further comprises instructions configured for encoding said matching pattern via a raster image processor via a particular code book.

12. The system of claim 9 wherein said instructions for mapping said gray value to said matching pattern further comprises instructions configured for mapping said gray value to said matching pattern via a tone-reproduction curve.

13. The system of claim 12 wherein said matching pattern is contained in a particular code book defined for IOT.

14. The system of claim 9 wherein:

said instructions for encoding a matching pattern with respect to an original pattern to generate a matching function for converting a screen into an IOT screen further comprises instructions configured for encoding said matching pattern via a raster image processor via a particular code book; and said instructions for mapping said gray value to said matching pattern further comprises instructions configured for mapping said gray value to said matching pattern via a tone-reproduction curve.

15. The system of claim 14 further comprising configuring said matching pattern to reduce errors between neighboring screens including IOT screen.

16. The system of claim 14 wherein said matching pattern is contained in a particular code book defined for IOT.

17. A non-transitory processor-readable medium storing code representing instructions to cause a process for super resolution encoding, said code comprising code to:

encode a matching pattern with respect to an original pattern to generate a matching function for converting a screen into an IOT screen;

account for a disturbance that causes a change in gray value that includes a minimal error while remaining close to said original pattern; and map said gray value to said matching pattern via said matching function to convert said screen into said IOT screen and thereby minimize the effects of lossy compression and data variations caused by said disturbance.

18. The processor-readable medium of claim 17 wherein said code further comprises code to configure said matching pattern to reduce errors between neighboring screens including IOT screen.

19. The non-transitory processor-readable medium of claim 17 wherein said code to encode a matching pattern with respect to an original pattern to generate a matching function for converting a screen into an IOT screen further comprises code to:

encode said matching pattern via a raster image processor via a particular code book.

20. The processor-readable medium of claim 17 wherein said code to map said gray value to said matching pattern further comprises code to map said gray value to said matching pattern via a tone-reproduction curve, and wherein said matching pattern is contained in a particular code book defined for IOT.

* * * * *